Patented Feb. 9, 1943

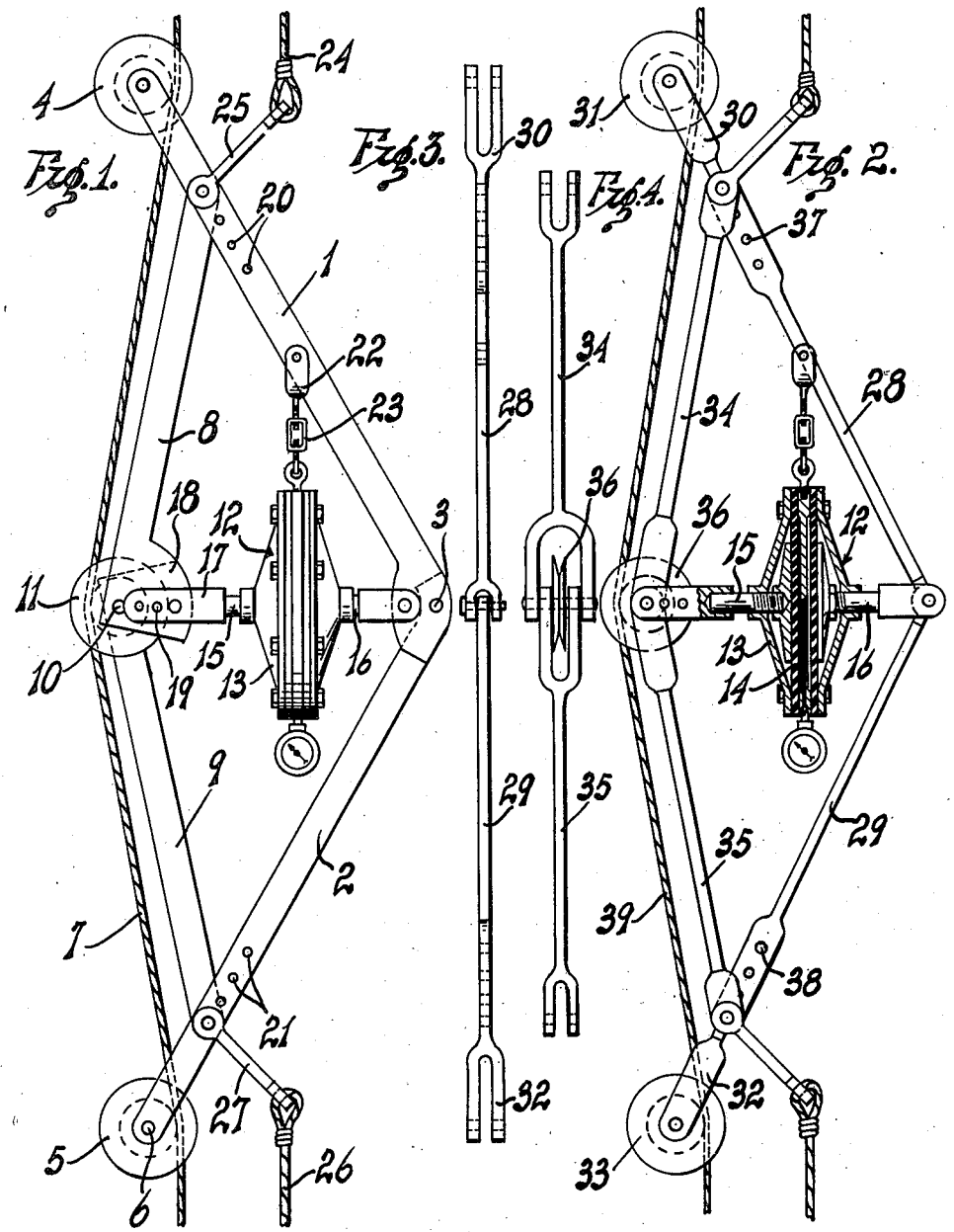

2,310,597

UNITED STATES PATENT OFFICE 2,310,597

CARRIAGE TYPE WEIGHT INDICATOR

Harold A. Raphael, Bellflower, Calif.

Application April 13, 1940, Serial No. 329,488

7 Claims. (Cl. 265—1.6)

This invention relates to a carriage for weight indicators, which is adapted to be mounted on a line or cable, which is carrying various weights, or upon which various strains are placed.

An object of my invention is to provide a novel carriage for weight indicators, which can be quickly and easily mounted on a line or cable, and which will accurately transmit forces to a weight indicator to indicate to a driller or the like the amount of load or strain which is placed upon the cable.

A further object of my invention is to provide a carriage of the character stated, which is simple in construction, inexpensive to manufactue, and effective in operation.

A feature of my invention resides in the arrangement of arms comprising the carriage, whereby forces are transmitted to a weight indicator of the type having a diaphragm, the diaphragm being acted upon by a pin or head engaged or actuated by certain of the arms of the carriage when a load is applied thereon.

An advantage of my novel carriage for weight indicators resides in the arrangement of the arms of the carriage in the form of a polygon, the arms being adjustable relative to each other to vary the shape of the polygon, thus altering the sensitivity of the weight indicator, and also varying the forces which are applied to the weight indicator through the arms of the carriage, the arms in turn being moved by the varying tension placed in the cable on which the carriage is mounted.

Other objects, advantages and features of invention may appear from the accompanying drawing, the subjoined detailed description, and the appended claims.

In the drawing:

Figure 1 is a side elevation of my carriage for weight indicators.

Figure 2 is a side elevation of a slightly modified form of carriage for weight indicators.

Figure 3 is an end view of the outside arms of the carriage shown in Figure 2.

Figure 4 is an end view of the inside arms of the carriage as disclosed in Figure 2.

Referring more particularly to the drawing, the numerals 1 and 2 indicate the outside arms of a carriage for weight indicators, these arms being made of suitable structural shapes which may be either flat plates, angles, channels, or the like. The arms 1 and 2 are pivotally connected at their inner ends by a pin 3. At the outer end of the arm 1, a sheave 4 is pivotally mounted, and at the outer end of the arm 2, a similar sheave 5 is mounted. The sheaves 4, 5 are mounted on a removable pin, such as the pin 6, and the operator can easily remove this pin in order to place the cable 7 on the inside of the sheaves as shown. The cable 7 may be the dead line of a drilling oil well or the like, or it may be any cable in which varying tensions or loads are placed. A pair of inner arms 8, 9 are pivotally secured together at their inner ends by a pin 10. The pin 10 also serves to mount a third sheave 11, over which the cable 7 also passes. The outer ends of the arms 8 and 9 are pivotally attached to the arms 1, 2 respectively, these pivotal attachments being within the sheaves 4 or 5—that is, between these sheaves and the inner ends of the arms 1 and 2.

A weight indicator 12 is mounted within the polygon formed by the arms, 1, 2, 8 and 9. This weight indicator may be of a diaphragm type, comprising an outer housing 13, within which one or more diaphragms 14 are mounted. A pair of pins 15, 16 extend from the indicator housing 12, the pin 15 including a yoke 17, which is pivotally secured to the arm 8, and preferably to a foot or enlargement 18 on the arm. The yoke 17 may be provided with a plurality of spaced holes 19 so that the yoke may be adjusted horizontally relative to the foot 18, which may be necessary when the arms 8, 9 are variously adjusted on the arms 1 and 2, which adjustment may be accomplished by moving the outer pivot pins of the arms 8 and 9 into any one of the spaced holes 20 or 21. The pin 16 is pivotally attached at its outer end to the arm 1, as shown in Figure 1. The weight indicator 12 is supported from the arm 1 by means of a link 22, this link including a turnbuckle 23 so that the length of the link can be varied in order to move the weight indicator vertically, thus placing the pins 15 and 16 in horizontal alignment with the pivot pins 3 and 10. The turnbuckle adjustment is used whenever the position of the four arms is changed relative to each other—for example when the various adjustments previously described have been made.

The carriage is supported by a cable 24, which extends to a girt or the like in the derrick, and the lower end of this cable is attached to a clevis 25, which is secured to the arm 1. Similarly, the carriage is held against upward movement by a cable 26 attached to the floor of the derrick, and the upper end of this cable is secured to a clevis 27, which is secured to the arm 2. Thus, the carriage is held against vertical movement when the cable 7 is moved due to changing the position of the cable in the derrick, this operation being performed to eliminate excessive wear on any particular part of the cable.

In Figures 2 to 4 inclusive, I have disclosed a modified form of carriage, the general construction and operation being identical to that previously described, the only difference residing in the shape or construction of the arms. The outer arms 28, 29 are formed of bars, a clevis or bifurcation 30 being formed at the outer end of the arm 28 to receive the sheave 31. Similarly, the lower end of the arm 29 is formed with a bifurcation or clevis 32 to receive the sheave 33. The inner arms 34 and 35 carry the central sheave 36 and the outer ends of these arms are pivotally attached to the arms 28, 29 respectively, and are also adjustable on these arms due to the arrangement of spaced holes 37 and 38 in the same manner as previously described in the detailed description of Figure 1. The cable 39 is threaded over the sheaves 31, 33 and 36 in the same manner as previously described. The weight indicator 12 has the same construction as previously described, and is similarly arranged and mounted.

Having described my invention, I claim:

1. A carriage type weight indicator, comprising a pair of outer arms, said outer arms being pivotally secured together at their inner ends, a sheave journaled on the outer end of each of said arms, a pair of inner arms, the outer ends of said inner arms being pivotally secured to the outer arms, means pivotally connecting the inner ends of the inner arms together, a third sheave journaled at the inner ends of the inner arms, a weight indicator, weight indicator actuating members projecting from said weight indicator, means pivotally connecting one of said members to the outer arms, and means pivotally connecting the other of said members to the inner arms, means suspending the weight indicator between the inner and outer arms, said suspension means being longitudinally adjustable, whereby the weight indicator and actuating members may be aligned with the inner and outer arms.

2. A carriage type weight indicator comprising a pair of outer arms, said outer arms being pivotally secured together at their inner ends, a sheave journaled on the outer end of each of said arms, a pair of inner arms, the outer ends of said inner arms being pivotally secured to the outer arms, means pivotally connecting the inner ends of the inner arms together, a third sheave journaled at the inner ends of the inner arms, a weight indicator, weight indicator actuating members projecting from said weight indicator, means pivotally connecting one of said members to the outer arms, and means pivotally connecting the other of said members to the inner arms, means suspending the weight indicator between the inner and outer arms, said suspension means being longitudinally adjustable.

3. A carriage type weight indicator comprising a pair of outer arms, said outer arms being pivotally secured together at their inner ends, a sheave journaled at the outer end of each of the outer arms, a pair of inner arms, the inner ends of the inner arms being pivotally secured together, the outer ends of the inner arms being pivotally attached to the outer arms adjacent the outer ends of said outer arms, a third sheave journaled on said inner arms, a weight indicator mounted in the carriage, a pair of pins projecting from the weight indicator, one of said pins being pivotally attached to the outer arms and the other of said pins being pivotally attached to the inner arms, said pins being in substantial alignment whereby pressure on both pins will cause simultaneous pressure on and actuation of the weight indicator.

4. A carriage type weight indicator comprising a pair of outer arms, said outer arms being pivotally secured together at their inner ends, a sheave journaled at the outer end of each of the outer arms, a pair of inner arms, the inner ends of the inner arms being pivotally secured together, the outer ends of the inner arms being pivotally attached to the outer arms adjacent the outer ends of said outer arms, a third sheave journaled on said inner arms, a weight indicator mounted in the carriage, a pair of pins projecting from the weight indicator, one of said pins being pivotally attached to the outer arms and the other of said pins being pivotally attached to the inner arms, adjustable supporting means in the carriage supporting the weight indicator, said supporting means being longitudinally adjustable, whereby the weight indicator and actuating members may be aligned with the inner and outer arms.

5. A carriage type weight indicator comprising a pair of outer arms, said outer arms being pivotally secured together at their inner ends, a sheave journaled at the outer end of each of the outer arms, a pair of inner arms, the inner ends of the inner arms being pivotally secured together, the outer ends of the inner arms being pivotally attached to the outer arms adjacent the outer ends of said outer arms, a third sheave journaled on said inner arms, a weight indicator mounted in the carriage, a pair of pins projecting from the weight indicator, one of said pins being pivotally attached to the outer arms and the other of said pins being pivotally attached to the inner arms, and means adjustably connecting the weight indicator pin to said inner arms.

6. A carriage type weight indicator comprising a pair of outer arms, said outer arms being pivotally secured together at their inner ends, a sheave journaled at the outer end of each of the outer arms, a pair of inner arms, the inner ends of the inner arms being pivotally secured together, the outer ends of the inner arms being pivotally attached to the outer arms adjacent the outer ends of said outer arms, a third sheave journaled on said inner arms, a weight indicator mounted in the carriage, a pair of pins projecting from the weight indicator, one of said pins being pivotally attached to the outer arms and the other of said pins being pivotally attached to the inner arms, adjustable supporting means in the carriage supporting the weight indicator, said supporting means being longitudinally adjustable, and means adjustably connecting the weight indicator pin to said inner arms.

7. A carriage type weight indicator for cables comprising a plurality of arms forming a polygon, the pair of arms projecting outwardly at an angle to the cable, having a cable engaging means on one end thereof, there being a cable engaging means positioned at the upper and lower ends of the carriage, a third cable engaging means on the pair of arms positioned adjacent the cable, said third cable engaging means being arranged between the first named cable engaging means, a weight indicator mounted within the polygon, weight indicator operating means projecting from the weight indicator and arranged substantially horizontal, said operating means being pivotally attached to the first named and second named arms forming said polygon, an adjustable means suspending the weight indicator in the carriage, said adjustable means being attached at one end to one of said arms, and at the other end to the weight indicator, said adjustable means being horizontally adjustable whereby the weight indicator may be adjusted vertically in the carriage.

HAROLD A. RAPHAEL.